United States Patent [19]

Jang

[11] Patent Number: 5,714,066
[45] Date of Patent: Feb. 3, 1998

[54] WATER PURIFIER HAVING SEPARATE SINK-MOUNTED DISCHARGE FAUCETS FOR DISPENSING PURIFIED WATER AND DISCHARGING WASTE WATER

[75] Inventor: Jae Young Jang, Kyungki-Do, Rep. of Korea

[73] Assignee: Samsung Electronics Co., Ltd., Suwon, Rep. of Korea

[21] Appl. No.: 717,789

[22] Filed: Sep. 23, 1996

[30] Foreign Application Priority Data

Sep. 23, 1995 [KR] Rep. of Korea .......... 95-32153

[51] Int. Cl.$^6$ .......... B01D 35/30
[52] U.S. Cl. .......... 210/434; 210/460; 210/500.21; 285/156; 285/180
[58] Field of Search .......... 4/629, 679, 680, 4/DIG. 7; 285/156, 180; 137/216, 261.1; 210/251, 321.6, 433.1, 434, 460, 500.21; 138/37, 89, 109, 120, 155, 177

[56] References Cited

U.S. PATENT DOCUMENTS

| | | | |
|---|---|---|---|
| 4,556,484 | 12/1985 | Hunter et al. | 210/459 |
| 4,771,485 | 9/1988 | Traylor | 137/216 |
| 4,775,465 | 10/1988 | Burrows | 210/433.1 |
| 4,856,121 | 8/1989 | Traylor | 137/216 |
| 4,859,320 | 8/1989 | Beall, Jr. | 210/433.1 |
| 5,176,165 | 1/1993 | Traylor | 137/216 |
| 5,449,456 | 9/1995 | Bowman | 210/460 |
| 5,635,058 | 6/1997 | Bowman | 210/460 |

*Primary Examiner*—W. L. Walker
*Attorney, Agent, or Firm*—Burns, Doane, Swecker & Mathis, L.L.P.

[57] ABSTRACT

A water purifying system includes filters for purifying tap water, a storage tank for storing the purified water, and a water discharge apparatus. The filters include a membrane filter which produces purified water and waste water. The water discharge apparatus includes a housing mounted on a sink, the bottom of the housing being open to accommodate a tap water supply conduit, a purified water dispensing conduit from the storage tank, and a waste water discharge conduit from the membrane filter. Mounted on the housing are first and second faucets communicating, respectively, with the purified water conduit and the waste water conduit for dispensing purified water and discharging waste water into the sink.

13 Claims, 3 Drawing Sheets

WATER PURIFIER HAVING SEPARATE SINK-MOUNTED DISCHARGE FAUCETS FOR DISPENSING PURIFIED WATER AND DISCHARGING WASTE WATER

BACKGROUND OF THE INVENTION

1. Field of the Invention

The present invention relates to a water purifying apparatus for removing various harmful substances contained in tap water such as faucet water and the like, and more particularly to a water discharge apparatus for discharging purified water and waste water

2. Description of the Prior Art

A conventional water purifier is constructed such that tap water supplied from a faucet is caused to pass through separate filtering means for water purification, thereby removing foreign objects contained in the tap water.

The water purifier of this kind can be classified, according to the purifying method, into a natural filtering method, a direct connection filtering method, ion an exchange resin method and a reverse osmosis method and the like.

Among these methods, a water purifier by the reverse osmosis method, in particular, performs water purifying by applying a predetermined pressure to the tap water to cause same to pass through an artificial osmotic membrane for water purification, whereby heavy metal, bacteria, carcinogen and the like are removed and at the same time, only pure water and dissolved oxygen are allowed to pass therethrough, so that the water purifier by the osmotic membrane method is used for most up-to-date scientific industries and sophisticated cleaning or medical electronic elements.

Furthermore, the reverse osmotic water purifier is widely used in the house and in the business circles.

The prior art water purifier employing the above principle is disposed as illustrated in FIG. 1, with filtering means 40 for removing foreign objects contained in the tap water supplied through a water supply pipe 30 connected at one end thereof to a tap water pipe 20 underneath a sink 10. The pipe 20 is connected to a main faucet F.

The filtering means 40 is provided at one end thereof with a purified water tank 50 for storing the water purified by being sequentially passed through the filtering means 40.

Furthermore, the purified water tank 50 is connected to a purified water faucet 70 for receiving the purified water stored in the tank 50 through a purified water pipe 60 to thereby discharge same to an upper portion of the sink 10.

The filtering means 40 includes a pre-preprocessing filter 41 for sequentially receiving the tap water supplied from the tap water pipe 20 to thereby remove the foreign objects contained in the tap water, a preprocessing filter 42, a post-processing filter 43, a membrane filter 44 for removing fine foreign objects contained in the tap water supplied from the post-processing filter 43 and simultaneously supplying the purified water to the purified water tank 50, and an activated carbon filter 45 for sucking and removing chlorine odor, organic composite substances and the like contained in the purified water supplied from the purified water tank 50 to the faucet 70.

A concentrated water tube 80 is arranged between the membrane filter 44 and a discharge pipe 12 in order to discharge, through the discharge pipe 12 connected to a sink water tub 11, the concentrated (waste) water generated in the course of water being purified in the membrane filter 44.

However, there is a problem in the concentrated water discharge apparatus of a water purifier thus constructed in that contaminated and polluted water from daily life, foreign objects and the like which pass from the sink 11 to the discharge pipe can pass into the membrane filter 44 through the concentrated water tube 80, thereby further increasing contamination of the filter which is an essential part of the water purifier, shortening the life thereof and decreasing the quality of its purifying operation as well.

SUMMARY OF THE INVENTION

Accordingly, it is an object of the present invention to provide a concentrated water discharge apparatus of a water purifier for preventing contaminated and polluted water from being infused into a membrane filter through concentrated water tube to thereby avoid filter contamination to prolong the life of the filters and to increase a reliability thereof as well.

In accordance with the object of the present invention, there is provided a concentrated water discharge apparatus of a water purifier, the apparatus comprising:

a body for installing at a lower side therein a plurality of tubes at a predetermined spacing; and a faucet being disposed at an external side of the body to be connected to a corresponding plurality of tubes, whereby the body is fastened to one side of a sink by fastening means.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

Now, a concentrated water discharge apparatus of a water purifier according to the present invention will be described in detail with reference to the accompanying drawings.

Figure 1:
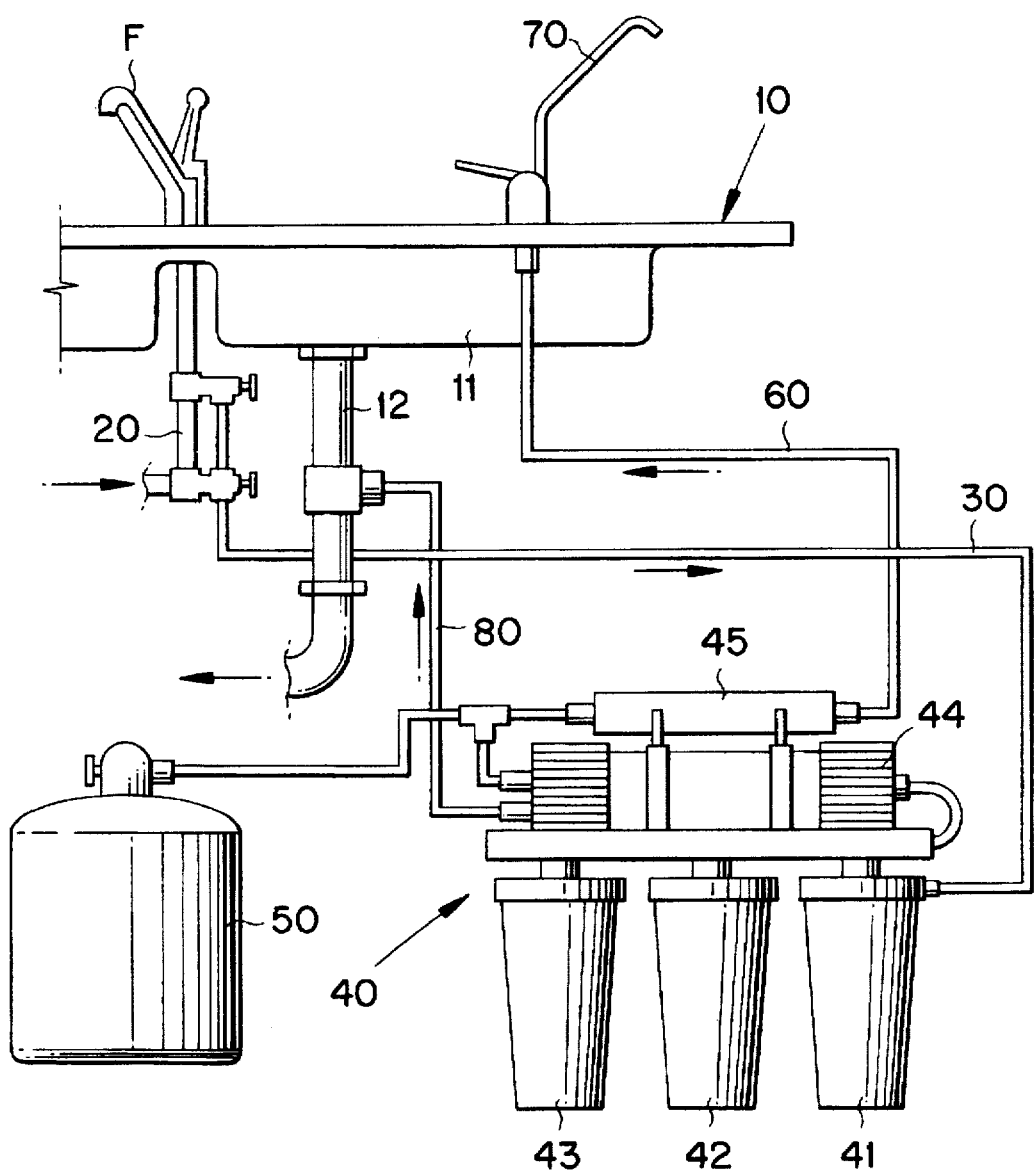
FIG. 1 is a schematic diagram for illustrating a water purifier according to the prior art.
Figure 2:
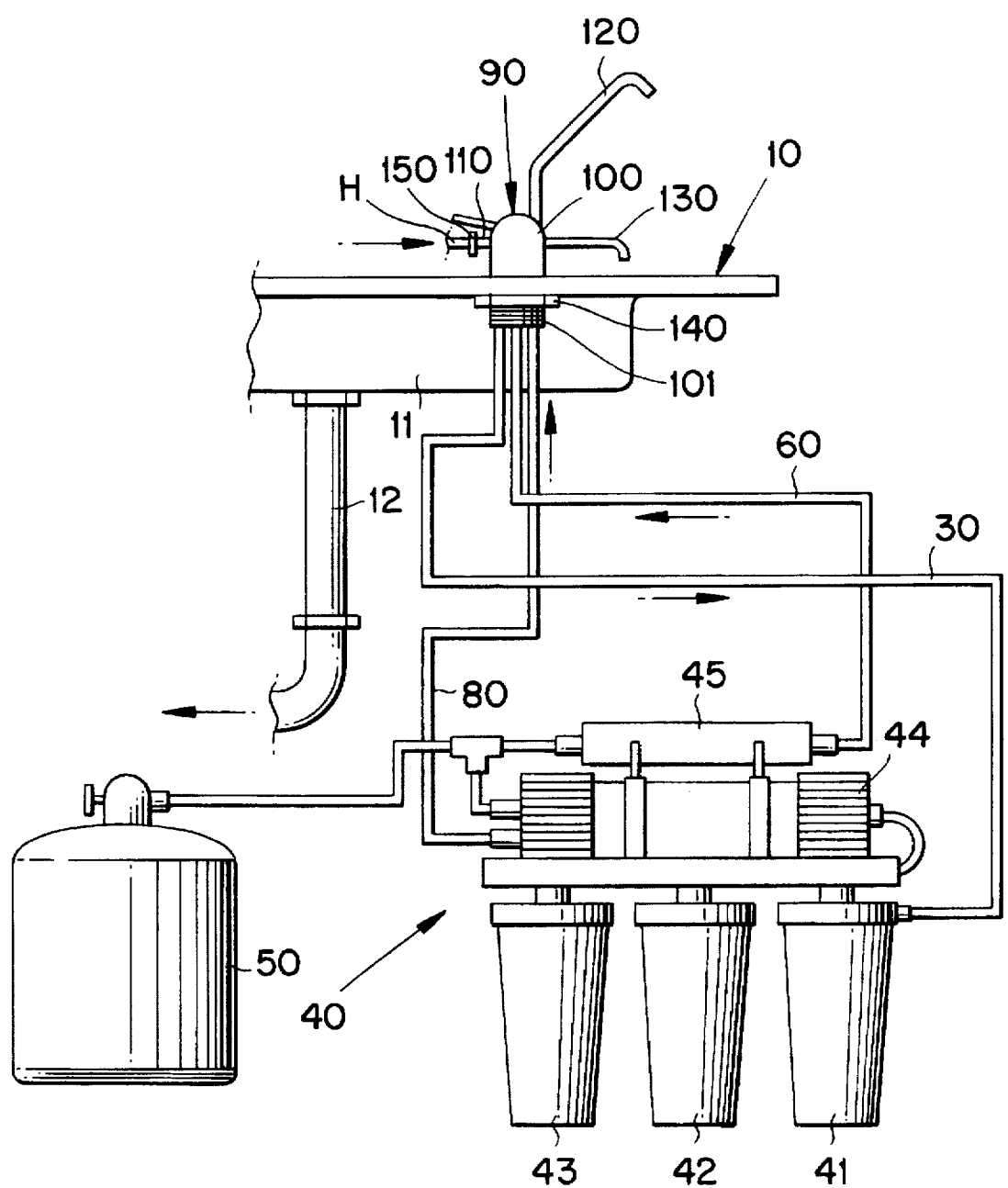
FIG. 2 is a schematic diagram for illustrating a water purifier according the present invention.
Figure 3:
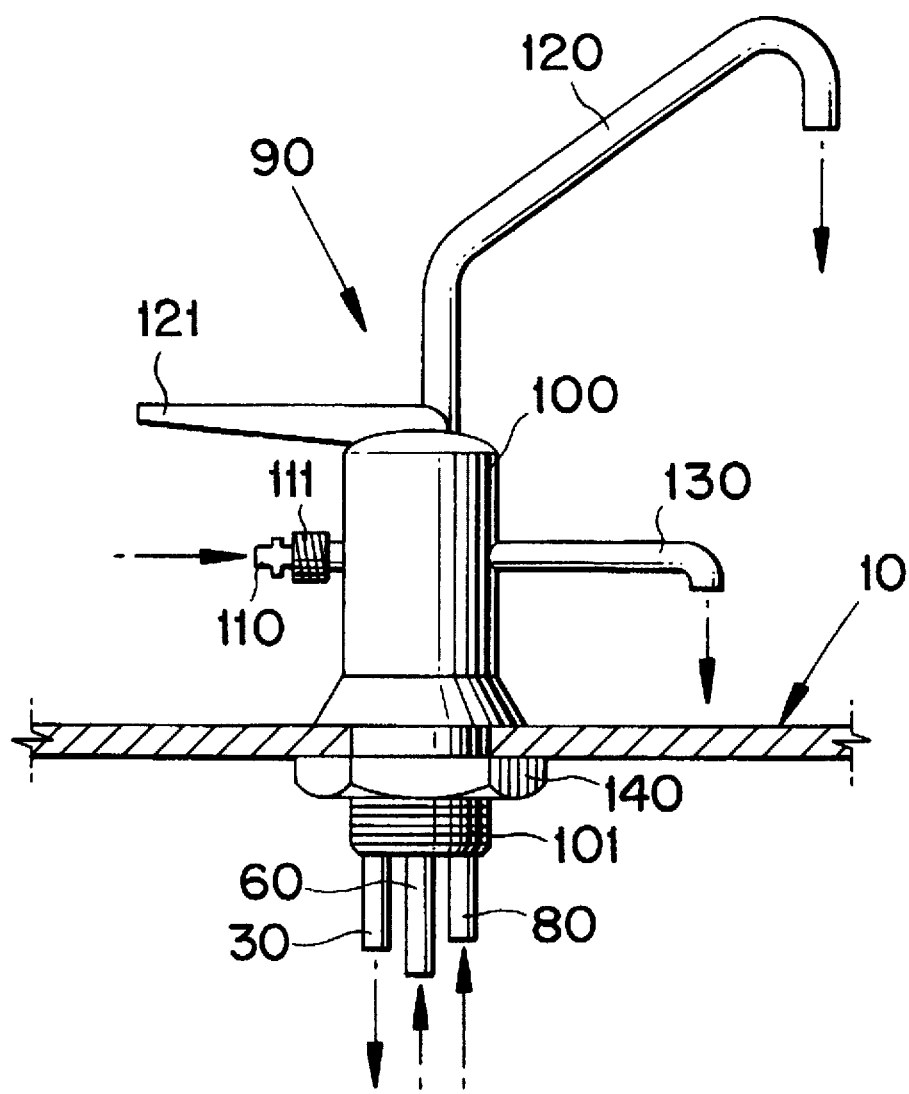
FIG. 3 is a schematic diagram for illustrating a purified water faucet of the concentrated water discharge apparatus of a water purifier according to an embodiment of the present invention.

Throughout the drawings, like reference numerals and symbols from FIG. 1 are used in FIGS. 2 and 3 for designation of like or equivalent parts or portions for simplicity of illustration and explanation, and the detailed description thereof is not repeated.

As will be explained, the present invention involves the provision of separated sink-mounted faucets for the discharge of purified water and waste water. Referring to FIG. 2, reference numeral 90 represents a purified water faucet assembled body for supplying tap water to the pre-preprocessing filter 41, and, at the same time, for discharging to an upper area of the sink 10 the water purified in the course of passing through the activated carbon filter 45 and the concentrated waste water generated in the course of water being purified in the membrane filter 44.

The purified water faucet assembled body 90 includes a housing 100 to which is mounted a fitting 110 that is connected to the tap water faucet F (see FIG. 1) by a connecting hose H and at the same time, is connected at a lower end thereof to the water supply tube 30 to supply tap water from the hose H to the pre-preprocessing filter 41.

The housing 100 is centrally provided with a purified water faucet 120 connected to the purified water tube 60 in order to discharge to the upper area of the sink 10 the purified water purified in the course of passing through the activated carbon filter 45.

Furthermore, the housing 100 is provided at a right side thereof with a concentrated water faucet 130 to which the concentrated water tube 80 is connected in order to discharge to the upper area of the sink 10 the concentrated (waste) water generated in the membrane filter 44.

At this time, the housing 100 is formed with a thread portion 101 so that the lower end thereof can penetrate a side of an upper surface of the sink 10 and be coupled to a fastening nut 140 to supportively be fixed to the sink 10.

The fitting 110 is formed at an end thereof with a thread portion 111 as illustrated in FIG. 3, so that the connecting hose H can be fixedly attached thereto by a cap nut 150.

The purified water faucet 120 is mounted for swivel movement, and a tip end thereof is bent downward at a predetermined angle while a lower end thereof is provided with a purified water valve lever 121 for opening and closing the faucet 120.

The concentrated water faucet 130 is provided with a passage to discharge the concentrated water therethrough when a microcomputer(not shown) that controls the purifying mechanism causes the concentrated water to be conducted to faucet 130.

Next, an operational effect of the concentrated water discharge apparatus of a water purifier according to the present invention thus constructed will be described.

As shown in FIG. 2, when the tap water faucet F (see FIG. 1) is opened tap water flows under pressure to the filtering 110 and then sequentially passes through the pre-preprocessing filter 41, preprocessing filter 42, post-processing filter and the membrane filter 44, to remove foreign objects contained in the tap water.

The part of the tap water which passes through the membrane filter 44 becomes purified water to thereafter be stored in the purified water storage tank 50 upon opening of the faucet 120 purified water stored and reserved in the tank 50 is infused into the activated carbon filter 45 according to pressure in the tank 50 to remove chlorine odor, organic composite substances and the like.

Meanwhile, the portion of the tap water which has passed the membrane filter 44 becomes concentrated (waste) water to thereafter be guided into the concentrated water faucet 130, and, at the same time, discharged to the upper area of the sink 10 through the opened passage of the faucet 130 according to the control of a microcomputer, so that the contaminated and polluted water, foreign objects and the like can be prevented from being infused into the membrane filter 44 through the concentrated water tube 80, which then prevents filter contamination in advance, prolong life of the filters and improve performances of the product.

As is apparent from the foregoing, there is an advantage in the concentrated water discharge apparatus of a water purifier according to the present invention, in that, because the apparatus is constructed such that the concentrated water generated from the membrane filter is conducted to a concentrated water faucet rather than to a pipe through which sink waste water flows. Hence, the sink waste water cannot flow into the membrane filter, the result being to avoid filter contamination, prolong the life of the filter and increase performance of the product.

What is claimed is:

1. A water purifying apparatus, comprising:

a filter mechanism connectable to a source of tap water for purifying the tap water, the filter mechanism including a membrane filter for producing from the tap water purified water and waste water, the filter mechanism including a purified water outlet and a waste water outlet; and a water discharge apparatus, including:
a housing adapted for connection to a sink,
a first discharge structure mounted on the housing and communicating with the purified water outlet for dispensing purified water, and
a second discharge structure mounted on the housing and communicating with the waste water outlet for discharging waste water into a sink.

2. The water purifying apparatus according to claim 1, wherein the first and second discharge structures comprise first and second faucets, respectively.

3. The water purifying apparatus according to claim 2, wherein the water discharge apparatus further includes a fitting adapted to be connected to a source of tap water, the fitting communicating with a tap water inlet of the filter mechanism.

4. The water purifying apparatus according to claim 2, wherein the water discharge apparatus further includes a manual valve lever for opening and closing the first faucet.

5. The water purifying apparatus according to claim 2, wherein the housing includes means for connecting the housing to a sink.

6. The water purifying apparatus according to claim 2, wherein the housing includes a cylindrical lower portion having external screw threading adapted to receive an internally threaded nut for connecting the housing to a sink.

7. The water purifying apparatus according to claim 2, wherein the water discharge apparatus further comprises first and second conduits extending through an open bottom of the housing, the first conduit interconnecting the first faucet and the purified water outlet, and the second conduit interconnecting the second faucet with the waste water outlet.

8. The water purifying apparatus according to claim 2, wherein the filter mechanism includes a storage tank for storing purified water, the purified water outlet disposed on the storage tank.

9. A water discharge apparatus for discharging both purified water and waste water received from a water filtering mechanism, the water discharge mechanism comprising:

a housing including a fastening structure for connecting the housing to a sink, a bottom of the housing being open to accommodate a purified water conduit and a waste water conduit; and first and second discharge structures mounted on the housing for discharging purified water and waste water, respectively.

10. The water discharge apparatus according to claim 9, wherein the first and second discharge structures comprise first and second faucets, respectively.

11. The water discharge apparatus according to claim 10, further comprising a fitting on the housing for conducting tap water to the filter mechanism.

12. The water discharge apparatus according to claim 10, wherein a lower portion of the housing has an external screw threading, and further including a nut having an internal screw threading for connection with the external threading for connecting the housing to a sink.

13. The water discharge apparatus according to claim 10, further including a valve handle mounted on the housing for opening and closing the first faucet.

* * * * *